US012768299B2

(12) United States Patent
Akula et al.

(10) Patent No.: US 12,768,299 B2
(45) Date of Patent: Oct. 20, 2026

(54) ALTERNATIVE FUEL COMBUSTOR WITH RECIRCULATION ZONE

(71) Applicant: GE Vernova Infrastructure Technology LLC, Greenville, SC (US)

(72) Inventors: Rajani Kumar Akula, Bengaluru (IN); Juergen Gerhard Hoffmann, Baden (CH); Michael John Hughes, State College, PA (US)

(73) Assignee: GE Vernova Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 18/536,628

(22) Filed: Dec. 12, 2023

(65) Prior Publication Data

US 2025/0067212 A1 Feb. 27, 2025

(30) Foreign Application Priority Data

Aug. 25, 2023 (IN) ............................ 202311057110

(51) Int. Cl.
*F02C 3/20* (2006.01)
*F02C 7/22* (2006.01)

(52) U.S. Cl.
CPC . *F02C 3/20* (2013.01); *F02C 7/22* (2013.01)

(58) Field of Classification Search
CPC .... F02C 9/28; F02C 7/228; F02C 9/34; F02C 7/22; F02C 7/222; F02C 3/04; F02C 7/12; F02C 7/24; F02C 9/26; F02C 9/40; F02C 3/20; F02C 7/057; F02C 7/18; F02C 7/264; F02C 9/00; F02C 9/263; F02C 9/32;

(Continued)

(56) References Cited

U.S. PATENT DOCUMENTS 4,373,325 A 2/1983 Shekleton
4,845,940 A 7/1989 Beer (Continued)

FOREIGN PATENT DOCUMENTS

CN 111322636 A 6/2020
CN 111878849 A 11/2020

(Continued)

OTHER PUBLICATIONS

Co-Pending U.S. Appl. No. 18/455,728, filed Aug. 25, 2023.

(Continued)

*Primary Examiner* — Anthony Ayala Delgado
(74) *Attorney, Agent, or Firm* — Dority & Manning, P.A.

(57) ABSTRACT

A combustor includes a combustion liner that extends along an axial centerline from a forward end to an aft end. The combustion liner defines a combustion chamber. The combustor includes a center fuel nozzle that extends along the axial centerline at least partially within the combustion chamber. The combustor further includes a plurality of outer fuel nozzles that surround the center fuel nozzle. The plurality of outer fuel nozzles terminate at the forward end. The combustor further includes a vortex generating element that is configured to induce a recirculation zone for the stabilization of a flame. The combustor further includes a fuel injector that is coupled to the combustion liner at least partially downstream of center fuel nozzle. The combustor further includes an air injector that is coupled to the combustion liner downstream of the fuel injector.

19 Claims, 9 Drawing Sheets

(58) Field of Classification Search
CPC .... F02C 3/14; F02C 3/34; F02C 7/141; F02C 7/20; F02C 7/2365; F02C 7/262; F02C 7/28; F02C 7/32; F23N 2241/20; F23R 3/14; F23R 3/286; F23D 14/64; F23D 14/48; F23D 14/24; F23D 14/62
See application file for complete search history.

(56) References Cited

U.S. PATENT DOCUMENTS

| | | | | |
|---|---|---|---|---|
| 5,199,255 | A * | 4/1993 | Sun | F23J 7/00 60/772 |
| 7,284,378 | B2 | 10/2007 | Amond, III et al. | |
| 8,457,861 | B2 | 6/2013 | Davis, Jr. et al. | |
| 8,789,372 | B2 | 7/2014 | Johnson et al. | |
| 9,010,120 | B2 | 4/2015 | DiCintio et al. | |
| 9,557,050 | B2 | 1/2017 | Vandervort et al. | |
| 2009/0173075 | A1 | 7/2009 | Miura et al. | |
| 2013/0042622 | A1 | 2/2013 | Zebroski | |
| 2016/0326961 | A1 | 11/2016 | Tomita et al. | |
| 2018/0172277 | A1* | 6/2018 | Bulat | F23R 3/286 |
| 2019/0017707 | A1 | 1/2019 | Kim et al. | |
| 2021/0071870 | A1* | 3/2021 | Bulat | F23R 3/286 |
| 2022/0333534 | A1 | 10/2022 | Smith et al. | |
| 2022/0403783 | A1 | 12/2022 | Miller et al. | |
| 2023/0212978 | A1 | 7/2023 | Nakamura | |

FOREIGN PATENT DOCUMENTS

| | | | |
|---|---|---|---|
| EP | 3486568 | B1 | 9/2020 |
| JP | 2023039683 | A | 3/2023 |
| WO | WO9932828 | A1 | 7/1999 |
| WO | WO2019088107 | A1 | 5/2019 |
| WO | WO2022172955 | A1 | 8/2022 |

OTHER PUBLICATIONS

Co-Pending U.S. Appl. No. 18/455,749, filed Aug. 25, 2023.
International Search Report Corresponding to Application No. PCT/US2024/042989 on Dec. 2, 2024.
International Search Report Corresponding to Application No. PCT/US2024/043038 on Nov. 27, 2024.
International Search Report Corresponding to Application No. PCT/US2024/043039 on Nov. 28, 2024.
International Search Report Corresponding to Application No. PCT/US2024/042195 on Aug. 28, 2025

* cited by examiner

ALTERNATIVE FUEL COMBUSTOR WITH RECIRCULATION ZONE

CROSS-REFERENCE TO RELATED APPLICATIONS

This application claims the benefit of priority to Indian Provisional Patent Application No. 202311057110, filed on Aug. 25, 2023, the disclosure of which is incorporated by reference herein in its entirety.

FIELD

The present disclosure relates generally to a gas turbine combustor capable of efficient operation on alternative fuels, such as ammonia or others.

BACKGROUND

Turbomachines are utilized in a variety of industries and applications for energy transfer purposes. For example, a gas turbine engine generally includes a compressor section, a combustion section, a turbine section, and an exhaust section. The compressor section progressively increases the pressure of a working fluid entering the gas turbine engine and supplies this compressed working fluid to the combustion section. The compressed working fluid and a fuel (e.g., natural gas for traditional systems) mix within the combustion section and burn in a combustion chamber to generate high pressure and high temperature combustion gases. The combustion gases flow from the combustion section into the turbine section where they expand to produce work. For example, expansion of the combustion gases in the turbine section may rotate a rotor shaft connected, e.g., to a generator to produce electricity. The combustion gases then exit the gas turbine via the exhaust section.

Traditional gas turbine engines include one or more combustors that burn a mixture of natural gas and air within the combustion chamber to generate the high pressure and temperature combustion gases. As a byproduct, nitrogen oxides (NOx) and other pollutants are created and expelled by the exhaust section. Regulatory requirements for low emissions from gas turbines are continually growing more stringent, and environmental agencies throughout the world are now requiring even lower rates of emissions of NOx and other pollutants from both new and existing gas turbines.

Alternative fuels can be used as a substitute for natural gas to reduce the production of NOx in the combustor. However, many alternative fuels have burning characteristics that make them unsuitable for use with traditional combustor operating methods. For example, such characteristics may include flame speed that is too slow/fast, flame temperature that is too hot/cold, and/or unwanted combustion byproducts.

Accordingly, an improved combustor capable of efficient operation on alternative fuels, such as ammonia ($NH_3$) and/or hydrogen, is desired and would be appreciated in the art.

BRIEF DESCRIPTION

Aspects and advantages of the combustors and gas turbines in accordance with the present disclosure will be set forth in part in the following description, or may be obvious from the description, or may be learned through practice of the technology.

In accordance with one embodiment, a combustor is provided. The combustor includes a combustion liner that extends along an axial centerline from a forward end to an aft end. The combustion liner defines a combustion chamber. The combustor includes a center fuel nozzle that extends along the axial centerline at least partially within the combustion chamber. The combustor further includes a plurality of outer fuel nozzles that surround the center fuel nozzle. The plurality of outer fuel nozzles terminate at the forward end. The combustor further includes a vortex generating element that is configured to induce a recirculation zone for the stabilization of a flame. The combustor further includes a fuel injector that is coupled to the combustion liner at least partially downstream of center fuel nozzle. The combustor further includes an air injector that is coupled to the combustion liner downstream of the fuel injector.

In accordance with another embodiment, gas turbine is provided. The gas turbine includes a compressor section, a turbine section, and a combustion section disposed downstream of the compressor section and upstream of the turbine section. The combustion section includes at least one combustor. The combustor includes a combustion liner that extends along an axial centerline from a forward end to an aft end. The combustion liner defines a combustion chamber. The combustor includes a center fuel nozzle that extends along the axial centerline at least partially within the combustion chamber. The combustor further includes a plurality of outer fuel nozzles that surround the center fuel nozzle. The plurality of outer fuel nozzles terminate at the forward end. The combustor further includes a vortex generating element that is configured to induce a recirculation zone for the stabilization of a flame. The combustor further includes a fuel injector that is coupled to the combustion liner at least partially downstream of center fuel nozzle. The combustor further includes an air injector that is coupled to the combustion liner downstream of the fuel injector.

In accordance with yet another embodiment, a method of operating a combustor in a gas turbine is provided. The combustor includes a combustion liner that defines a combustion chamber that extends between a forward end and an aft end. The method includes providing, with one or more fuel nozzles, fuel and an oxidant to the combustion chamber having a first equivalence ratio that is rich. The method further includes conveying the fuel and oxidant over a vortex generating element disposed within the combustion chamber, whereby a recirculation zone is induced aft of the vortex generating element. The method further includes providing additional oxidant to the combustion chamber aft of the vortex generating element such that the fuel and oxidants have a second equivalence ratio that is lean.

These and other features, aspects and advantages of the present combustors and gas turbines will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present combustors and gas turbines, including the best mode of making and using the present systems and methods, directed to one of ordinary skill in the art, is set forth in the specification, which makes reference to the appended figures, in which.

DETAILED DESCRIPTION

Figure 1:
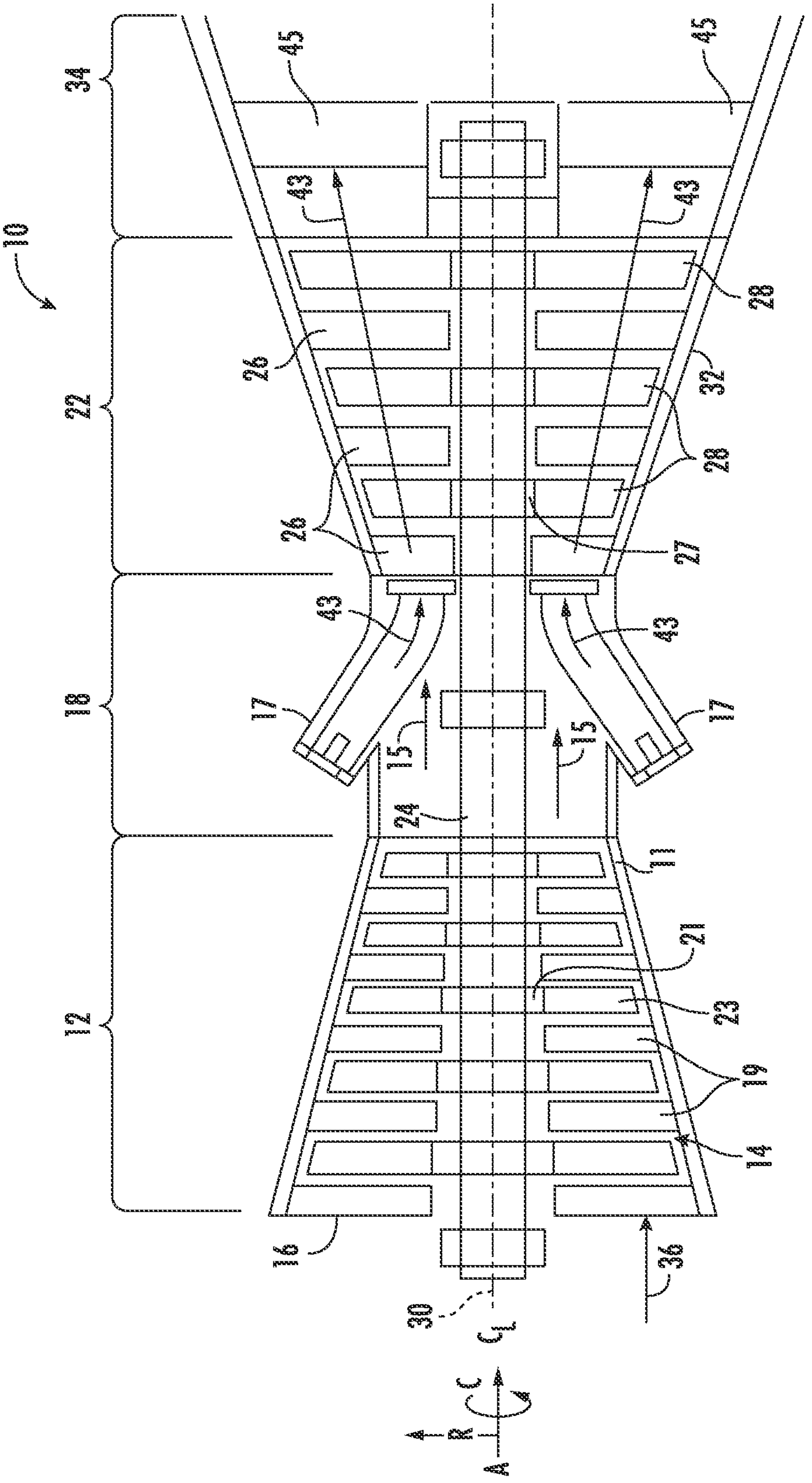
FIG. 1 is a schematic illustration of a turbomachine, in accordance with embodiments of the present disclosure.

Reference now will be made in detail to embodiments of the present combustors and gas turbines, one or more examples of which are illustrated in the drawings. Each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents.

The word “exemplary” is used herein to mean “serving as an example, instance, or illustration.” Any implementation described herein as “exemplary” is not necessarily to be construed as preferred or advantageous over other implementations. Additionally, unless specifically identified otherwise, all embodiments described herein should be considered exemplary.

The detailed description uses numerical and letter designations to refer to features in the drawings. Like or similar designations in the drawings and description have been used to refer to like or similar parts of the invention. As used herein, the terms “first”, “second”, and “third” may be used interchangeably to distinguish one component from another and are not intended to signify location or importance of the individual components.

The term “fluid” may be a gas or a liquid. The term “fluid communication” means that a fluid is capable of making the connection between the areas specified.

As used herein, the terms “upstream” (or “forward”) and “downstream” (or “aft”) refer to the relative direction with respect to fluid flow in a fluid pathway. For example, “upstream” refers to the direction from which the fluid flows, and “downstream” refers to the direction to which the fluid flows. The term “radially” refers to the relative direction that is substantially perpendicular to an axial centerline of a particular component, the term “axially” refers to the relative direction that is substantially parallel and/or coaxially aligned to an axial centerline of a particular component, and the term “circumferentially” refers to the relative direction that extends around the axial centerline of a particular component.

Terms of approximation, such as “about,” “approximately,” “generally,” and “substantially,” are not to be limited to the precise value specified. In at least some instances, the approximating language may correspond to the precision of an instrument for measuring the value, or the precision of the methods or machines for constructing or manufacturing the components and/or systems. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values, and/or endpoints defining range(s) of values. When used in the context of an angle or direction, such terms include within ten degrees greater or less than the stated angle or direction. For example, “generally vertical” includes directions within ten degrees of vertical in any direction, e.g., clockwise or counter-clockwise.

The terms “coupled,” “fixed,” “attached to,” and the like refer to both direct coupling, fixing, or attaching, as well as indirect coupling, fixing, or attaching through one or more intermediate components or features, unless otherwise specified herein. As used herein, the terms “comprises,” “comprising,” “includes,” “including,” “has,” “having” or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, “and/or” refers to an inclusive selection and not to an exclusive selection. For example, a condition A and/or B is satisfied by any one of the following: A is true (or present) and B is false (or not present), A is false (or not present) and B is true (or present), and both A and B are true (or present).

Here and throughout the specification and claims, where range limitations are combinable and interchangeable, such ranges are identified and include all the sub-ranges contained therein unless context or language indicates otherwise. For example, all ranges disclosed herein are inclusive of the endpoints, and the endpoints are independently combinable with each other.

As used herein, the term “line” may refer to a pipe, hose, tube, or other fluid carrying conduit.

Referring now to the drawings, FIG. 1 illustrates a schematic diagram of one embodiment of a turbomachine, which in the illustrated embodiment is a gas turbine engine 10. Although an industrial or land-based gas turbine is shown and described herein, the present disclosure is not limited to an industrial or land-based gas turbine engine, unless otherwise specified in the claims. For example, the invention as described herein may be used in any type of turbomachine including, but not limited to, a steam turbine, an aircraft gas turbine, or a marine gas turbine.

As shown in FIG. 1, the gas turbine 10 generally includes a compressor section 12. The compressor section 12 includes a compressor 14. The compressor 14 includes an inlet 16 that is disposed at an upstream end of the gas turbine engine 10. The gas turbine engine 10 further includes a combustion section 18 having one or more combustors 17 disposed downstream from the compressor section 12. The gas turbine engine 10 further includes a turbine section 22 (i.e., an expansion turbine) that is downstream from the combustion section 18. A shaft 24 extends generally axially through the gas turbine engine 10.

The compressor section 12 may generally include a plurality of rotor disks 21 and a plurality of rotor blades 23 extending radially outwardly from and connected to each rotor disk 21. Each rotor disk 21 in turn may be coupled to or form a portion of the shaft 24 that extends through the compressor section 12. The rotor blades 23 of the compressor section 12 may include turbomachine airfoils that define an airfoil shape (e.g., having a leading edge, a trailing edge, and side walls extending between the leading edge and the trailing edge). Additionally, in many embodiments, the compressor section 12 may include stator vanes 19 disposed between the rotor blades 23. The stator vanes 19 may extend from, and couple to, a compressor casing 11.

The turbine section 22 may generally include a plurality of rotor disks 27 and a plurality of rotor blades 28 extending radially outwardly from and being interconnected to each rotor disk 27. Each rotor disk 27 in turn may be coupled to or form a portion of the shaft 24 that extends through the turbine section 22. The turbine section 22 further includes an outer casing 32 that circumferentially surrounds the portion of the shaft 24 and the rotor blades 28. The turbine section 22 may include stator vanes 26 extending radially inward from the outer casing 32. The rotor blades 28 and stator vanes 26 may be arranged in alternating sequence to define turbine stages along an axial centerline 30 of gas turbine 10. Both the rotor blades 28 and the stator vanes 26 may include turbomachine airfoils that define an airfoil shape (e.g., having a leading edge, a trailing edge, and side walls extending between the leading edge and the trailing edge).

In operation, ambient air 36 or other working fluid is drawn into the inlet 16 of the compressor 14 and is progressively compressed to provide a compressed air 15 to the combustion section 18. The compressed air 15 flows into the combustion section 18 and is mixed with fuel to form a combustible mixture. The combustible mixture is burned within a combustion chamber of the combustor 17, thereby generating combustion gases 43 that flow from the combustion chamber into the turbine section 22. Energy (kinetic and/or thermal) is transferred from the combustion gases 43 to the rotor blades 28, causing the shaft 24 to rotate and produce mechanical work. The spent combustion gases 43 (also called "exhaust gases") exit the turbine section 22 and flow through the exhaust diffuser 34 across a plurality of struts or main airfoils 45 that are disposed within the exhaust diffuser 34.

The gas turbine engine 10 may define a cylindrical coordinate system having an axial direction A extending along the axial centerline 30, a radial direction R perpendicular to the axial centerline 30, and a circumferential direction C extending around the axial centerline 30.

Figure 2:
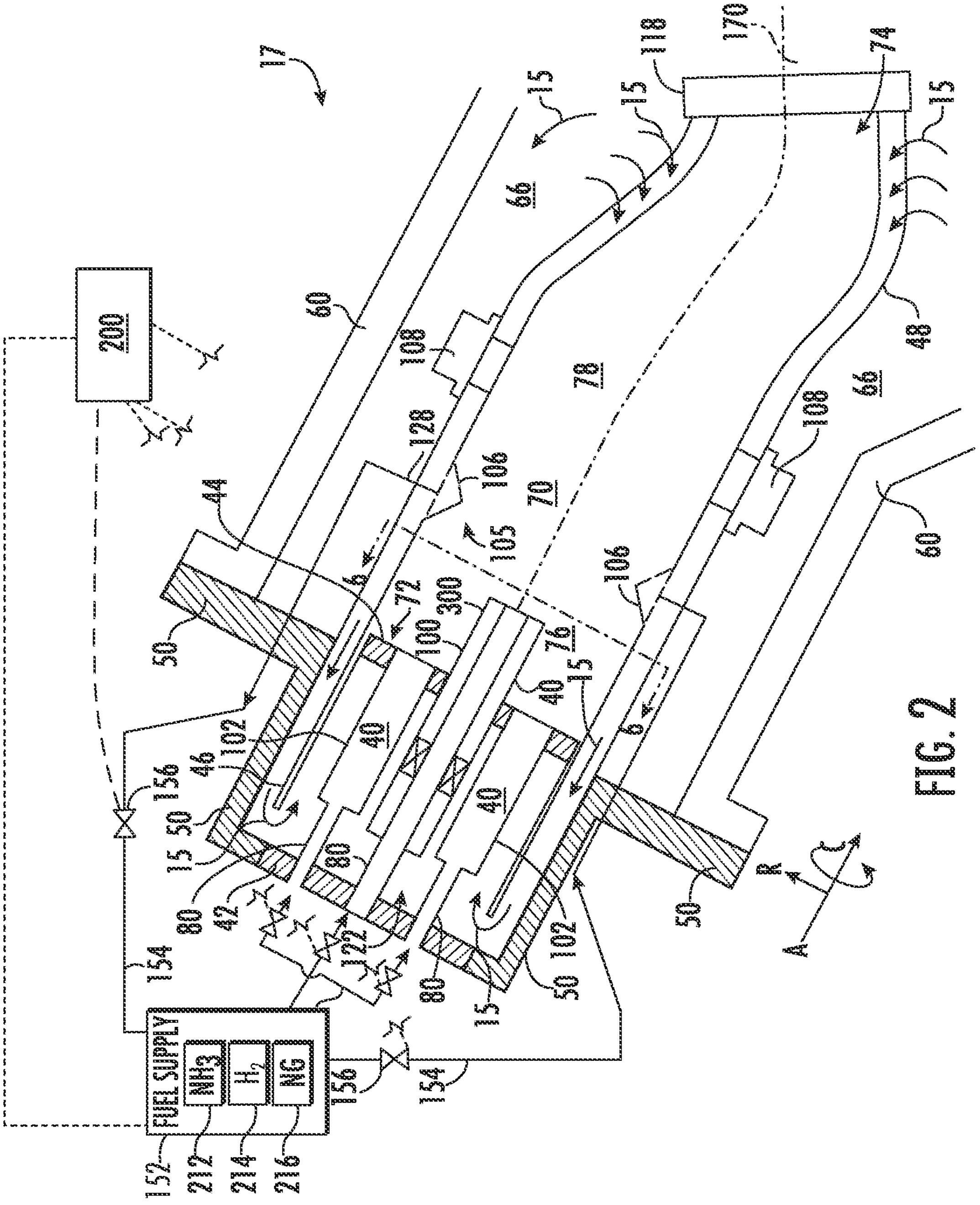
FIG. 2 illustrates a combustor as may be used in the turbomachine of FIG. 1, in accordance with embodiments of the present disclosure.

FIG. 2 is a schematic representation of a combustor 17, as may be included in a can annular combustion system for the gas turbine engine 10. In a can annular combustion system, a plurality of combustors 17 (e.g., 8, 10, 12, 14, 16, or more) are positioned in an annular array about the shaft 24 that connects the compressor section 12 to the turbine section 22.

As shown in FIG. 2, the combustor 17 may define a cylindrical coordinate system having an axial direction A that extends along an axial centerline 170. The combustor may also define a circumferential direction C which extends around the axial direction A and the axial centerline 170. The combustor 17 may further define a radial direction R perpendicular to the axial direction A and the axial centerline 170.

As shown in FIG. 2, the combustor 17 includes a combustion liner 46 that defines a combustion chamber 70 extending between a forward end 72 and an aft end 74. The combustion liner 46 may be positioned within (i.e., circumferentially surrounded by) an outer sleeve 48, such that an annulus 47 is formed therebetween. That is, the outer sleeve 48 may be spaced radially outward of the combustion liner 46 to define the annulus 47 through which compressed air 15 flows to a head end of the combustor 17. For example, compressed air 15 may enter the annulus 47 through the outer sleeve 48 (e.g., through apertures proximate the aft frame 118) and travel towards an end cover 42, such that the compressed air 15 within the annulus 47 flows opposite the direction of combustion gases within the combustion liner 46. Heat is transferred convectively from the combustion liner 46 to the compressed air 15, thus cooling the combustion liner 46 and warming the compressed air 15.

In some embodiments, the outer sleeve 48 may include a flow sleeve and an impingement sleeve coupled to one another. The flow sleeve may be disposed at the forward end, and the impingement sleeve disposed at the aft end. Alternately, the outer sleeve 48 may have a unified body (or "unisleeve") construction, in which the flow sleeve and the impingement sleeve are integrated with one another in the axial direction. As before, any discussion of the outer sleeve 48 herein is intended to encompass both conventional combustion systems having a separate flow sleeve and impingement sleeve and combustion systems having a unisleeve outer sleeve.

The combustion liner 46 may contain and convey combustion gases to the turbine section 22. The combustion liner 46 defines the combustion chamber 70 within which combustion occurs. As shown in FIG. 2, the combustion liner 46 may extend between the fuel nozzles 40 and an aft frame 118. The combustion liner 46 may have a cylindrical liner portion and a tapered transition portion that is separate from the cylindrical liner portion, as in many conventional combustion systems. Alternately, the combustion liner 46 may have a unified body (or "unibody") construction, in which the cylindrical portion and the tapered portion are integrated with one another. Thus, any discussion of the combustion liner 46 herein is intended to encompass both conventional combustion systems having a separate liner and transition piece and those combustion systems having a unibody liner. Moreover, the present disclosure is equally applicable to those combustion systems in which the transition piece and the stage one nozzle of the turbine section 22 are integrated into a single unit, sometimes referred to as a "transition nozzle" or an "integrated exit piece."

A forward casing 50 and the end cover 42 of the combustor 17 define the head end air plenum 122, which includes the one or more fuel nozzles 40. Particularly, the one or more fuel nozzles 40 may include a center fuel nozzle 100 extending along the axial centerline 170 of the combustor 17 and a plurality of outer fuel nozzles 102 surrounding the center fuel nozzle 100. The forward casing 50 may be fluidly and mechanically connected to a compressor discharge casing 60, which defines a high pressure plenum 66 around the combustion liner 46 and the outer sleeve 48. The fuel nozzles 40 may be positioned within the head end air plenum 122 defined at least partially by the forward casing 50. In many embodiments, the fuel nozzles 40 may extend from the end cover 42. For example, each fuel nozzle 40 may be coupled to an aft surface of the end cover 42 via a flange (not shown). As shown in FIG. 2, the at least one fuel nozzle 40 may be partially surrounded by the combustion liner 46.

The aft, or downstream ends, of the fuel nozzles 40 extend through a cap plate 44 that defines the upstream end of the combustion chamber 70 (and a downstream end of the head end air plenum 122). Particularly, the outer fuel nozzles 102 may terminate at an aft or downstream surface of the cap plate 44, and the center fuel nozzle 100 may extend axially beyond (or downstream) of the cap plate 44 into the combustion chamber 70. In other words, the outer fuel nozzles 102 may terminate at a downstream surface of the cap plate 44, such that the outer fuel nozzles extend through the cap plate 44 (but not into the combustion chamber 70) and inject fuel/air at the downstream surface of the cap plate 44 into the combustion chamber 70.

As discussed below, the outer fuel nozzles 102 may be any type of fuel nozzle, such as bundled tube fuel nozzles or swirler nozzles (often referred to as "swozzles"). In exemplary embodiments, the center fuel nozzle 100 may be an enlarged swirler nozzle (e.g., having a longer axial length than the outer fuel nozzles 102) that extends axially beyond the cap plate 44 and into the combustion chamber 70.

The fuel nozzles 40 may be positioned at the forward end of the combustor 17, and fuel may be directed through fuel supply conduits 80, which may extend through an end cover 42, and into the fuel nozzles 40. The fuel nozzles 40 convey the fuel and compressed air 15 into the combustion chamber 70, where combustion occurs. In some embodiments, the fuel and compressed air 15 are combined as a mixture prior to reaching the combustion chamber 70.

As mentioned above, the combustion liner 46 may define a combustion chamber that extends along an axial centerline from a forward end 72 to an aft end 74. The downstream surface of the cap plate 44, the outlets of the outer fuel nozzles 102, and the combustion liner 46 may collectively define the forward end 72 of the combustion chamber. The aft end 74 of the combustion chamber 70 may be disposed at the aft frame 118.

The center fuel nozzle 100 may extend along the axial centerline 170 of the combustor 17 at least partially within the combustion chamber 70. That is, the center fuel nozzle 100 may inject one of air, fuel, or air and fuel into the combustion chamber downstream of the plurality of outer fuel nozzles 102. The plurality of outer fuel nozzles 102 may collectively surround the center fuel nozzle and may terminate at the cap plate 44 at the forward end 72.

In exemplary embodiments, as will be discussed below in more detail, the combustor 17 may further include a fuel injector 105 (such as a venturi injector 106) coupled to (or integrated with) the combustion liner 46. The fuel injector 105 may be positioned at least partially downstream of center fuel nozzle 100. In some embodiments, the fuel injector 105 may be positioned within the combustion chamber 70 downstream of the center fuel nozzle (and the plurality of outer fuel nozzles 102). Additionally, the combustor 17 may include air injectors 108 coupled to the combustion liner 46. The air injector 108 may be coupled to the combustion liner 46 downstream of the fuel injector 105.

The air injector 108 may mount to the outer sleeve 48 and/or the combustion liner 46. The air injector 108 may extend radially from a first end within the high pressure plenum 66, through the outer sleeve 48, the annulus 47, and the combustion liner 46 to a second end. The second end may be disposed at the combustion liner 46 (e.g., radially flush or aligned therewith such that the air injector 108 does not extend into the combustion chamber 70). The air injectors 108 may be circumferentially spaced apart from one another on the outer sleeve 48 (e.g., equally spaced apart in some embodiments). The combustor 17 may include any number of air injectors (e.g., 1, 2, 3, or upwards of 10). Additionally, or alternatively, to the air injectors 108, the combustion liner 46 may define dilution holes, such that the combustion chamber 70 receives air from the annulus 47 rather than directly from the high pressure plenum 66 via the air injectors 108.

The fuel nozzles 40 and the fuel injector 105 may each be in fluid communication with a fuel supply system 152, which is configured to supply one or more fuels. In many embodiments, the center fuel nozzle 100, the plurality of outer fuel nozzles 102 and the fuel injector 105 may each be fluidly coupled to the fuel supply system 152 (e.g., via one or more fuel supply lines 154).

The fuel supply system 152 may selectively supply fuel to the center fuel nozzle 100, the outer fuel nozzles 102, and the fuel injector 105. That is, the fuel supply system 152 may be configured to selectively supply different fuel types, amounts, mixtures, etc. to each of the center fuel nozzle 100, the outer fuel nozzles 102, and the fuel injector 105. In many embodiments, the fuel supply system 152 may include an ammonia supply 212 (such as a liquid ammonia supply and/or gaseous ammonia supply), a hydrogen supply 214 (such as a liquid hydrogen supply and/or gaseous hydrogen supply), and/or a natural gas supply 216 (such as a methane supply or other natural gas). In some implementations, the fuel supply system 152 may provide a different type of fuel to each of the center fuel nozzle 100, the outer fuel nozzles 102, and the fuel injector 105 during operation of the combustor 17. In some implementations, the fuel supply system 152 may provide only one type of fuel to one or more of the center fuel nozzle 100, the outer fuel nozzles 102, and the fuel injector 105 at a time, such as solely ammonia, solely hydrogen, and/or solely natural gas. In other implementations, the fuel supply system 152 may provide a fuel mixture including any combination of ammonia, hydrogen, and/or natural gas to one or more of the center fuel nozzle 100, the outer fuel nozzles 102, and the fuel injector 105.

In many embodiments, one or more fuel supply lines 154 may fluidly couple each of the center fuel nozzle 100, the outer fuel nozzles 102, and the fuel injector 105 to the fuel supply system 152. One or more valves 156 may be disposed on, and in fluid communication with, the fuel supply lines 154. The valves 156 may be independently actuatable between an open position and a closed position. In the open position, fuel may be permitted to flow through the fuel supply line 154 to which the valve 156 is attached. In the closed position, fuel may be restricted or otherwise prevented from flowing through the fuel supply line 154 to which the valve 156 is attached.

In various embodiments, as shown in FIG. 2, a first fuel supply line 154 may extend between the fuel supply system 152 and the center fuel nozzle 100, and a first valve 156 may be disposed on, and in fluid communication with, the first fuel supply line 154. A second fuel supply line 154 may extend between the fuel supply system 152 and the outer fuel nozzle(s) 102, and a second valve 156 may be disposed on, and in fluid communication with, the second fuel supply line 154. A third fuel supply line 154 may extend between the fuel supply system 152 and the fuel injector 105, and a third valve 156 may be disposed on, and in fluid communication with, the third fuel supply line 154. In this way, each of the center fuel nozzle 100, the outer fuel nozzles 102, and the fuel injector 105 may be separately fluidly coupled to the fuel supply system 152. As such, each center fuel nozzle 100, the outer fuel nozzles 102, and the fuel injector 105 may be selectively provided with a fuel or fuels from the fuel supply system 152.

In many embodiments, a controller 200 may be operably connected to, and in communication with, the fuel supply system 152 and each of the valves 156. The controller 200 may be configured to send control signals to the fuel supply system 152 and/or the valves 156 to adjust their operation. For example, the controller 200 may selectively adjust the amount of fuel, fuel type, fuel mixture, etc. provided by the fuel supply system 152 to the fuel nozzles 40. Additionally, the controller 200 may selectively actuate or modulate the valves between the open position and the closed position to adjust which of the fuel nozzles 40 and/or the fuel injector 105 receives fuel.

Figure 3:
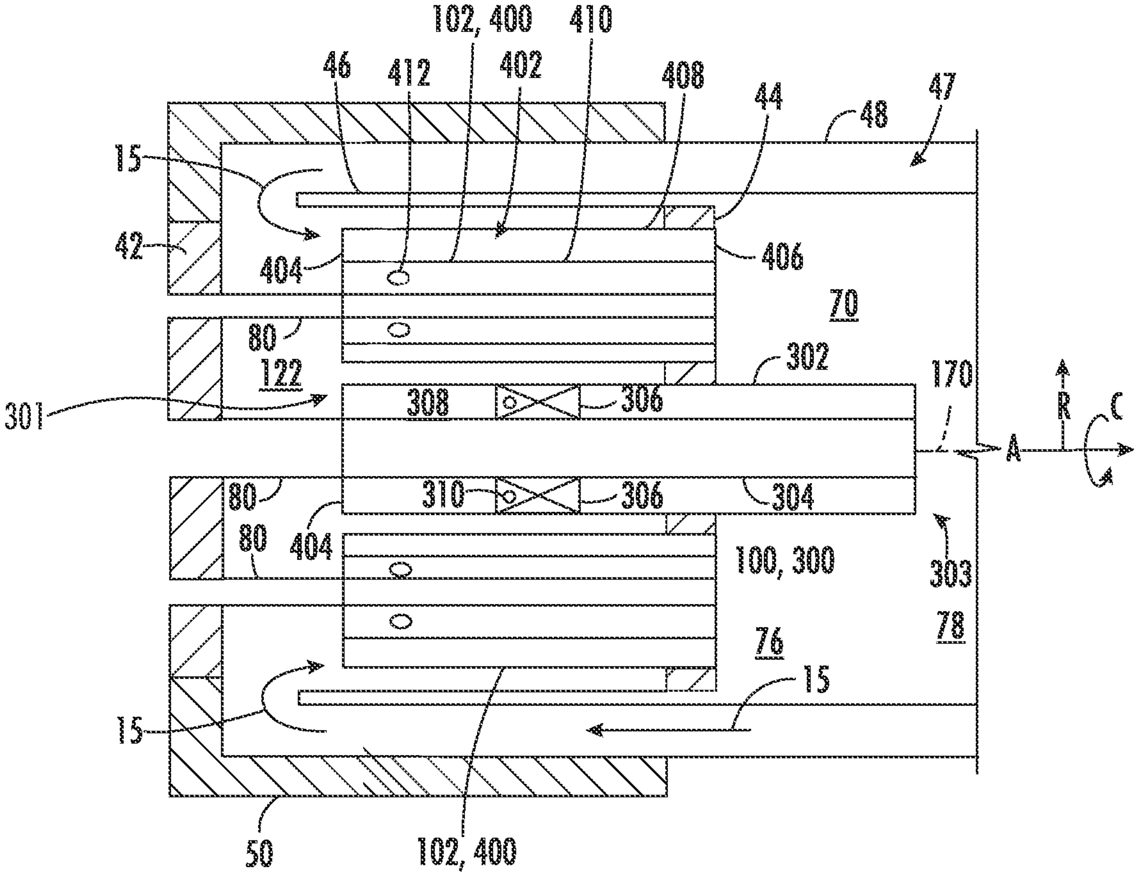
FIG. 3 illustrates an enlarged view of a forward portion of the combustor shown in FIG. 2, in accordance with embodiments of the present disclosure.

Referring now to FIG. 3, an enlarged view of a forward portion of the combustor 17 shown in FIG. 2 is illustrated in accordance with various aspects of the present disclosure. As shown in FIG. 3, in exemplary embodiments, the center fuel nozzle 100 may be a swirler nozzle 300 (or "swozzle") having an outer tube 302, a center body 304, and vanes 306 extending between the center body 304 and the outer tube 302. The swirler nozzle 300 may extend from a first end 301 disposed in the head end air plenum 122 to a second end 303 disposed in the combustion chamber 70. The swirler nozzle 300 may include a first portion disposed in the head end air plenum 122 and a second portion disposed in the combustion chamber 70.

The outer tube 302 and the center body 304 may extend axially between the first end 301 and the second end 303. The center body 304 may be radially spaced apart from the outer tube 302, such that an annulus 308 is defined between the outer tube 302 and the center body 304. The vanes 306 may extend between the center body 304 and the outer tube 302, and the vanes 306 may be disposed in the annulus 308. In many embodiments, the center body 304 may receive fuel (e.g., via the fuel conduit 80, which fluidly couples to the center body 304). The annulus 308 may receive air from the head end air plenum 122. The vanes 306 may be hollow and in fluid communication with both the center body 304 and the annulus 308, such that the vanes 306 inject fuel into the annulus 308 as air flows over the vanes 306. For example, the vanes 306 may define a fuel port 310 that provides fuel to the annulus 308. The air/fuel may mix together within the annulus downstream of the vanes 306 and be injected into the combustion chamber 70 at the second end 303. The vanes 306 may be contoured or curved and may define an airfoil shape in many embodiments, such that the vanes 306 induce swirl to the flow of fuel and air within the annulus 308.

The outer fuel nozzles 102 may be disposed radially outwardly of the swirler nozzle 300. In many embodiments, the outer fuel nozzles 102 may circumferentially surround the swirler nozzle 300. Additionally, the outer tube 302 of the swirler nozzle 300 may partially define the combustion chamber 70, such that the fuel/air from the outer fuel nozzles 102 travels along the outer tube 302, which advantageously creates a flow recirculation zone aft of the swirler nozzle 300 that promotes mixing and efficient combustion. In this way, the combustion chamber 70 may include an annular portion 76 defined between the combustion liner 46 and the outer tube 302. Particularly, the annular portion 76 may be defined radially between the combustion liner 46 and the outer tube 302, and the annular portion 76 may be defined axially between the outlets of the outer fuel nozzles 102 (or downstream surface of the cap plate 44) and the second end 303 of the swirler nozzle 300. The air (or fuel and air) traveling through the annulus 308 may advantageously be preheated by the combustion gases traveling through the combustion chamber 70 along the outer surface of the outer tube 302.

The combustion chamber 70 may further include a main portion 78 (FIG. 2) extending aft of the annular portion 76 to the aft end 74. Particularly, the main portion 78 may be defined entirely by the combustion liner 46 and may extend axially between the second end 303 of the swirler nozzle 300 and the aft end 74 of the combustion chamber 70.

In addition to air/fuel injection, the outer tube 302 of the swirler nozzle 300 may provide for bluff body stabilization within the combustion chamber 70. Bluff body stabilization occurs when the mixture of fuel/air exiting the outer fuel nozzles 102 combusts and passes around the outer tube 302 of the swirler nozzle. The combustion gases and un-combusted fuel/air mixture creates a wake or recirculation zone aft the swirler nozzle 300, which increases mixing and thereby facilitates the formation of a stable flame.

In some embodiments, the outer fuel nozzles 102 may each be a bundled tube fuel nozzle 400. The bundled tube fuel nozzle 400 may define a fuel plenum 402 with (e.g., collectively with) a forward plate 404, an aft plate 406, and an annular body 408 that extends (e.g., axially) between the forward plate 404 and the aft plate 406. The fuel plenum 402 may receive fuel from the fuel supply conduit 80, which is fluidly coupled thereto. A plurality of tubes 410 may extend from the forward plate 404, through the fuel plenum 402, and to the aft plate 406. The plurality of tubes 410 may each define an inlet (e.g., for air) at the forward plate 404, an outlet (e.g., for air/fuel) at the aft plate 406, and a passage extending between the inlet and the outlet. The inlet of each tube 410 may be fluidly coupled to the head end air plenum 122, and the outlet of each tube 410 may be in fluidly coupled to the combustion chamber 70. Each of the tubes 410 may define a fuel port 412 between the inlet and the outlet that fluidly couples the passage of the tube 410 to the fuel plenum 402. In other embodiments (not shown), the outer fuel nozzles 102 may each be swirler nozzles having a similar construction as the swirler nozzle 300 described above but terminating at the cap plate 44 rather than within the combustion chamber 70.

Figure 4:
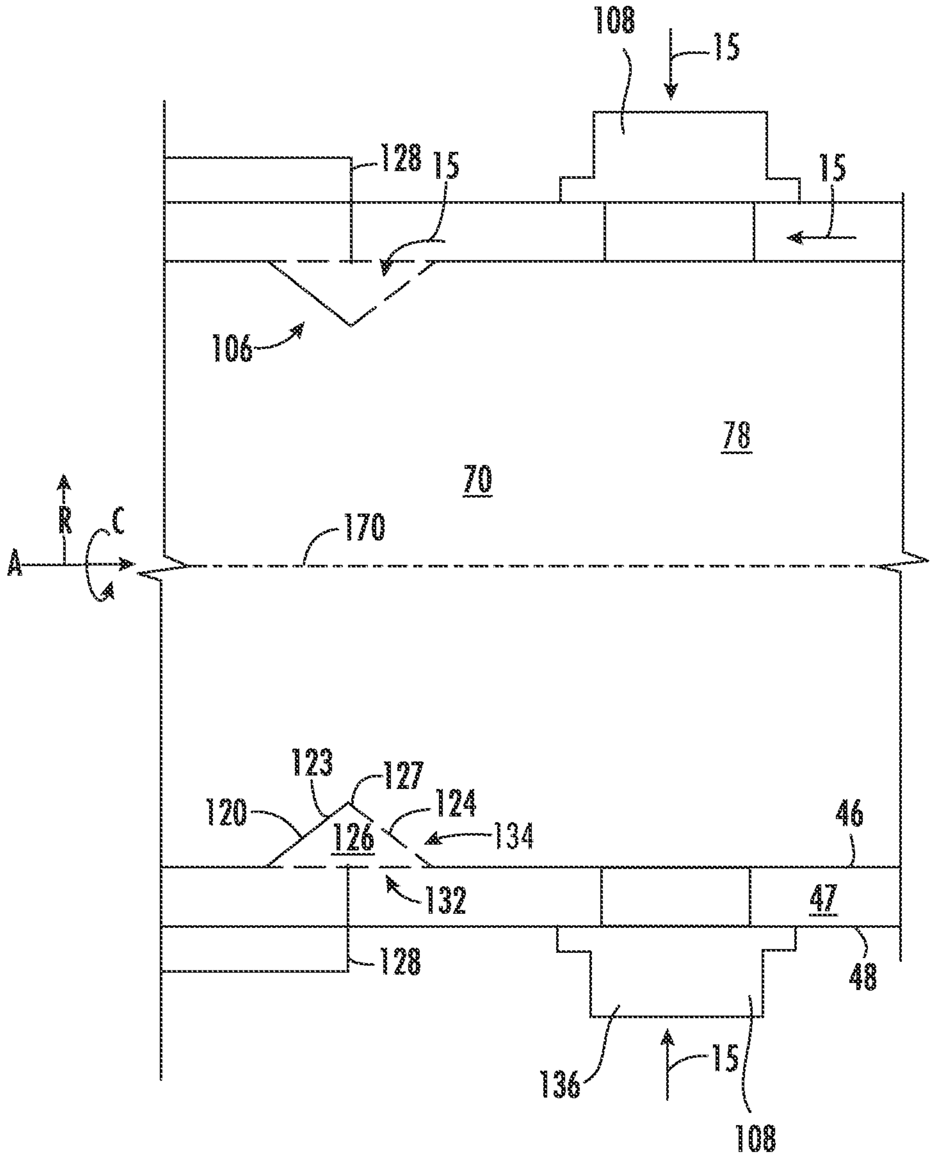
FIG. 4 illustrates an enlarged view of a middle portion of the combustor shown in FIG. 2, in accordance with embodiments of the present disclosure.

Referring now to FIG. 4, an enlarged view of a middle portion of the combustor 17 shown in FIG. 2 is illustrated in accordance with various aspects of the present disclosure. As shown in FIG. 4, the fuel injector 105 may be a venturi injector 106 disposed within the combustion chamber 70 at least partially downstream of the center fuel nozzle 100. The venturi injector 106 is an injector for injecting a fluid into the flow path of the combustion chamber 70 which causes a reduction in the cross section of the flow path followed by an increase of the cross section. The reduction in cross section leads to a local reduction in static pressure. The venturi injector 106 causes a vortex in the flow path downstream of the smallest cross section. The fluid is injected into the vortex. The vortex extends around the circumference of the whole combustion chamber 70 and allows a fast mixing of the injected fluid with the gas in the combustion chamber's flow path. The venturi injector 106 is capable of introducing air (or an oxygen containing fluid) to change the mixture of fuel/oxidizer within the combustion chamber 70 from rich to lean in a short axial distance. In addition, fuel may be introduced with the venturi injector 106 into the combustion chamber 70.

The venturi injector 106 may include a venturi nozzle body 120 having a first slanted wall 123, a second slanted wall 124, and an apex 127 at an intersection between the first slanted wall 123 and the second slanted wall 124. The venturi nozzle body 120 may be generally hollow and have a hollow interior 126 (or an interior that defines one or more fluid plenums or passages). The first slanted wall 123 and the second slanted wall 124 may be oblique, slanted, or otherwise angled with respect to the radial direction R and the axial direction A of the combustor 17 in the axial-radial plane (e.g., the plane shown by FIG. 4). The apex 127 may be the most radially inward point of the venturi nozzle body 120 (e.g., the point closest to the axial centerline 170). The second slanted wall 124 may be disposed downstream from the first slanted wall 123 with respect to the flow of combustion gases in the combustion chamber 70. In many embodiments, the venturi nozzle body 120 may extend annularly about the axial centerline 170. In some embodiments, the venturi injector 106 may have a generally triangular cross-sectional shape (in the axial-radial plane).

In exemplary embodiments, the first slanted wall 123 may extend towards the axial centerline 170 of the combustor 17 as the first slanted wall 123 extends from the combustion liner 46 to the apex 127. In other words, the first slanted wall 123 may diverge radially outwardly from the combustion liner 46 as the first slanted wall 123 extends axially from the combustion liner 46 to the apex 127. The first slanted wall 123 may face towards a forward end of the combustor 17 (e.g., towards the fuel nozzles 40), and the second slanted wall 124 may face towards an aft end of the combustor 17 (e.g., towards the aft frame 118). The second slanted wall 124 may extend away from the axial centerline 170 of the combustor 17 as the second slanted wall 124 extends from the apex 127 to the combustion liner 46. In other words, the second slanted wall 123 may converge radially inwardly toward the combustion liner 46 as the second slanted wall 123 extends axially from the apex 127 to the combustion liner 46.

Referring back to FIG. 2, briefly, the venturi injector 106 may be fluidly coupled to a fluid supply conduit 128. The fluid supply conduit 128 may extend through the forward casing 50 (e.g., through the forward casing flange), the high pressure plenum 66, the outer sleeve 48, the annulus 47, and the combustion liner 46 to fluidly couple the venturi injector 106 to the fuel supply line 154, thereby coupling the venturi injector 106 to the fuel supply system 152.

As shown in FIG. 4, the venturi nozzle body 120 (e.g., the interior 126) may receive fuel from the fluid supply conduit 128, and the venturi nozzle body 120 (e.g., the interior 126) may receive air from the annulus 47. Particularly, one or more air inlets 132 may be defined through the venturi nozzle body 120 and/or the combustion liner 46 to fluidly couple the interior 126 to the annulus 47. In many embodiments, the venturi injector 106 may include outlets 134 defined in the second slanted wall 124 of the venturi nozzle body 120. The outlet 134 may provide for fluid communication between the interior 126 of the venturi injector 106 and the combustion chamber 70.

In various embodiments, the air injector 108 may extend radially through the outer sleeve 48, the annulus 47, and the combustion liner 46 to provide for fluid communication between the high pressure plenum 66 and the combustion chamber 70. For example, the air injector 108 may include a main body 136 that is coupled to the outer sleeve 48 and extends through the outer sleeve 48 and the combustion liner 46. The main body 136 may define a passage or passages that receive compressed air 15 from the high pressure plenum 66. In one embodiment, a boss (not shown) supporting the air injector 108 functions as a fastener for securing the outer sleeve 48 to the combustion liner 46. In other embodiments, the air injector 108 may be coupled to the outer sleeve 48 in any suitable manner, and the outer sleeve 48 may have any suitable number of components coupled between the flange of the forward casing 50 and the turbine nozzle in any suitable manner that permits the air injector 108 to function as described herein.

FIGS. 5 through 9 each illustrate a portion of a combustor 17 in accordance with embodiments of the present disclosure. As should be appreciated, various features of the portion of the combustor 17 illustrated in FIGS. 5 through 9 may be incorporated into the combustor 17 shown and described above with reference to FIGS. 2 through 4 without departing from the scope and spirit of the present disclosure.

Figure 5:
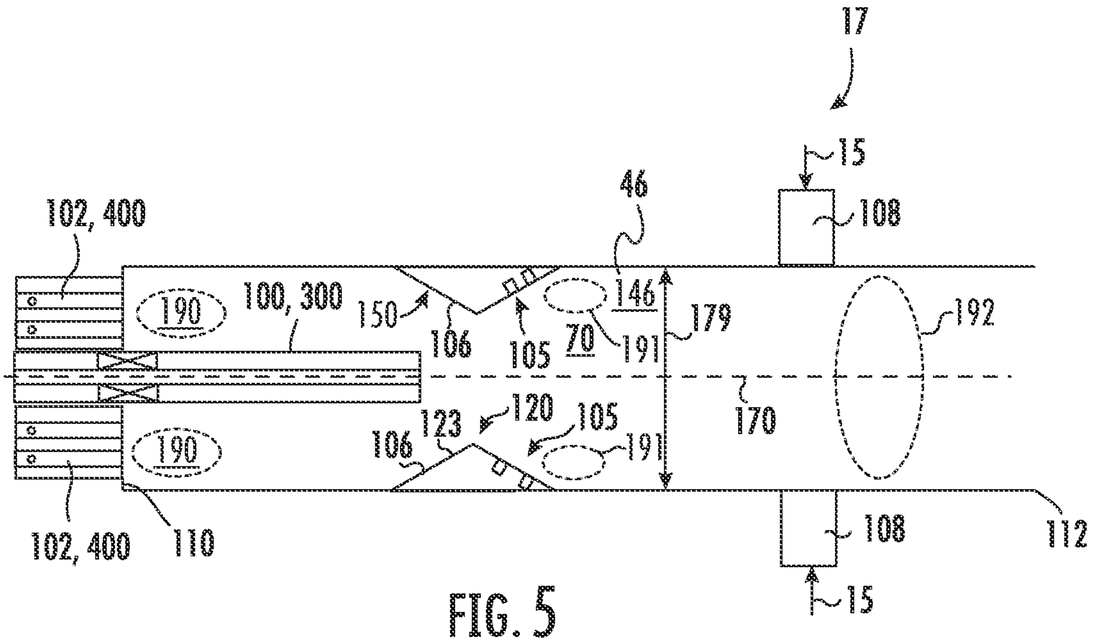
FIG. 5 illustrates a portion of a combustor, which may be incorporated into the combustor shown in FIG. 2, in accordance with embodiments of the present disclosure.
Figure 6:
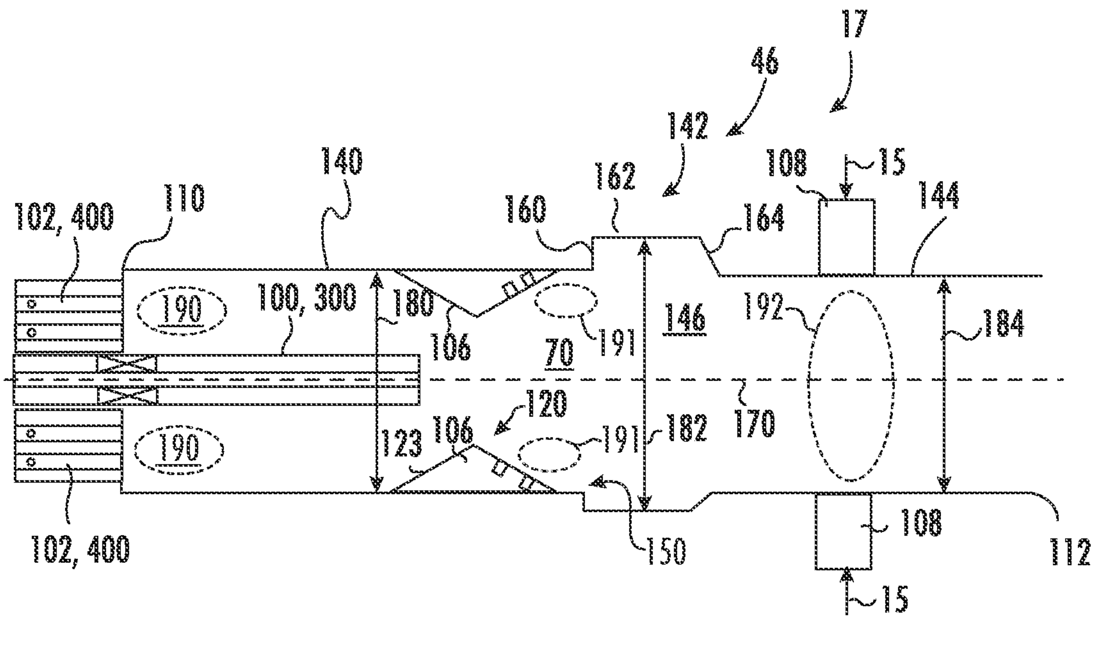
FIG. 6 illustrates a portion of a combustor, which may be incorporated into the combustor shown in FIG. 2, in accordance with embodiments of the present disclosure.
Figure 7:
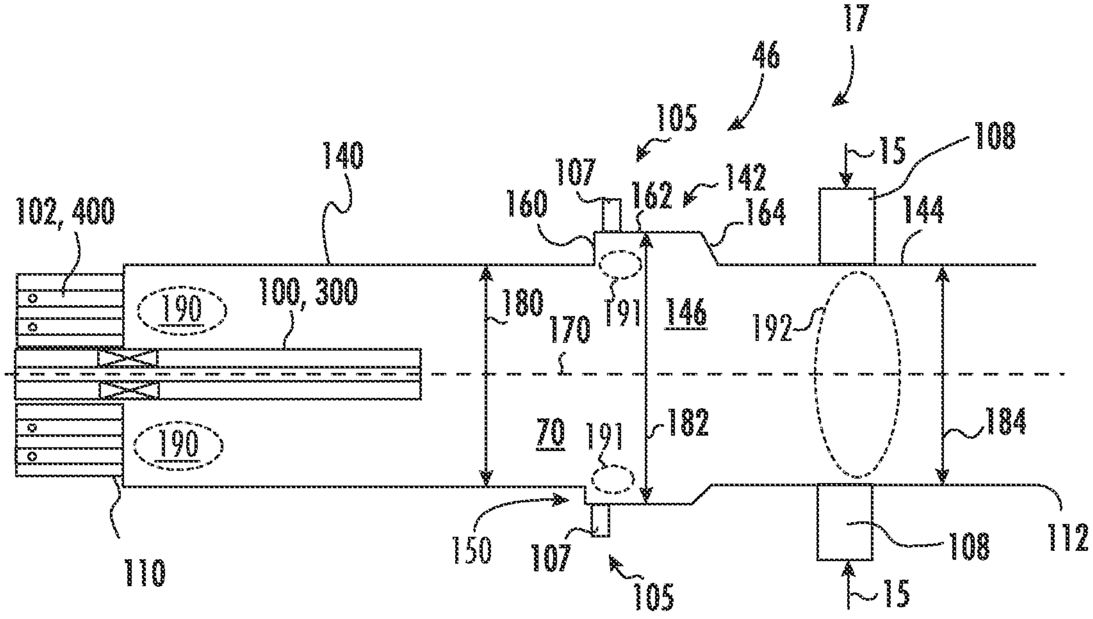
FIG. 7 illustrates a portion of a combustor, which may be incorporated into the combustor shown in FIG. 2, in accordance with embodiments of the present disclosure.

As shown in FIGS. 5 through 7, the combustor 17 may include a combustion liner 46 extending along an axial centerline 170 from a forward end 110 to an aft end 112. The combustion liner 46 may define a combustion chamber 70 within which combustion occurs. A center fuel nozzle 100 may extend along the axial centerline 170 at least partially within the combustion chamber 70. The center fuel nozzle 100 may be a swozzle 300 (which may have the features and structure of the swozzle 300 described above with reference to FIGS. 2 and 3). The combustor 17 may further include a plurality of outer fuel nozzles 102 surrounding the center fuel nozzle 100 (e.g., positioned about the center fuel nozzle 100 radially outward from the center fuel nozzle 100). The plurality of outer fuel nozzles 102 may terminate at the forward end 110 (e.g., cap plate 44), and the center fuel nozzle 100 may extend beyond the forward end 110 into the combustion chamber 70. In many embodiments, the plurality of outer fuel nozzles 102 may each be a bundled tube fuel nozzle 400 having a similar construction to the bundled tube fuel nozzle 400 described above with reference to FIG. 4.

Figure 8:
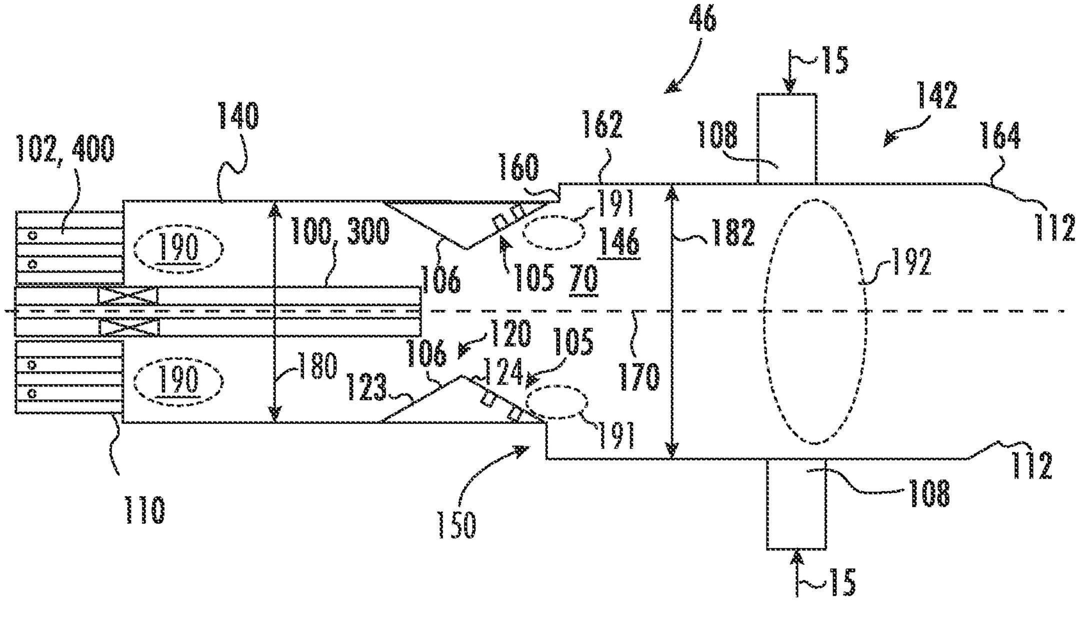
FIG. 8 illustrates a portion of a combustor, which may be incorporated into the combustor shown in FIG. 2, in accordance with embodiments of the present disclosure.

In exemplary embodiments, the combustor 17 may include a fuel injector 105 that is coupled to the combustion liner 46 at least partially downstream of center fuel nozzle 100. For example, as shown in FIGS. 5, 6, and 8, the fuel injector 105 may partially axially overlap with the center fuel nozzle 100, and the fuel injector 105 may extend axially beyond an aft end of the center fuel nozzle 100. In other embodiments (not shown), the fuel injector 105 may entirely axially overlap with the center fuel nozzle 100. Alternately, as shown in FIG. 2, the fuel injector 105 may not axially overlap the center fuel nozzle 100 at all (e.g., be axially spaced apart from the center fuel nozzle 100).

In many embodiments, as shown in FIGS. 5, 6, and 8, the fuel injector 105 may be a venturi injector 106 that is disposed within the combustion chamber 70 and coupled to an interior surface of the combustion liner 46. The venturi injector 106 shown in FIGS. 5, 6, and 8 may have a similar construction as the venturi injector 106 described above with reference to FIG. 4. In other embodiments, as shown in FIGS. 7 and 9, the fuel injector 105 may be disposed outside of the combustion chamber 70, such that the fuel injector 105 extends through the combustion liner 46 without extending into the combustion chamber 70.

In many embodiments, the combustor 17 may further include one or more air injectors 108 coupled to the combustion liner 46 downstream of the fuel injectors 105 with respect to the flow of combustion gases therethrough (e.g., the air injectors 108 are axially aft of the fuel injectors 105). The air injectors 108 may define one or more fluid passageways therethrough that permit air 15 to be injected radially into the combustion chamber 70. In many embodiments, the air injectors 108 may be fluidly coupled to the high pressure plenum 66 (FIG. 2). Additionally, or alternatively, the air injectors 108 may be fluidly coupled to the annulus 47 (FIG. 2).

In the embodiment shown in FIG. 5, the combustion liner 46 may define a diameter 179 from the forward end 110 to the aft end 112, which may be uniform in various embodiments. While the venturi injector 106 may effectively reduce the flow area within the combustion chamber 70, the venturi injector 106 may be coupled to the uniform diameter combustion liner 46 in FIG. 5. However, in other embodiments, as shown in FIGS. 6 through 9, the combustion liner 46 may define a diameter that varies from the forward end 110 to the aft end 112. In some embodiments, the aft end 112 may be coupled to a transition piece that further defines the combustion chamber and extends to an aft frame 118. The transition piece may transition the combustion chamber from having a generally circular cross section to having a generally rectangular cross section as the transition piece extends axially. In other embodiments, the aft end 112 may be coupled directly to the aft frame 118.

Figure 9:
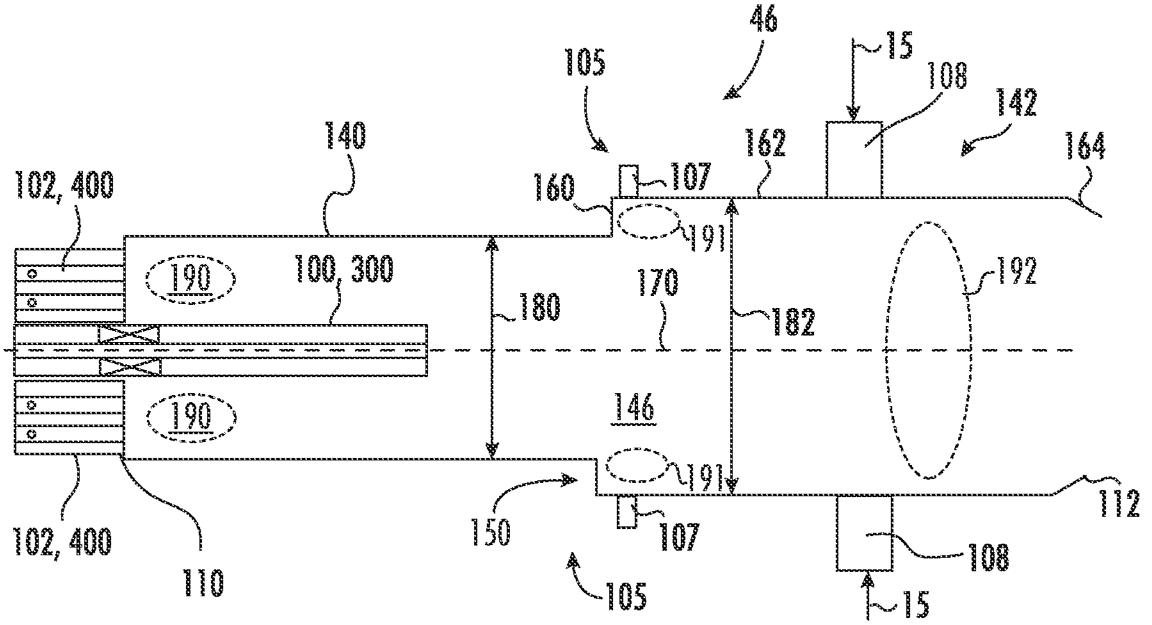
FIG. 9 illustrates a portion of a combustor, which may be incorporated into the combustor shown in FIG. 2, in accordance with embodiments of the present disclosure.

Particularly, as shown in FIGS. 6 through 9, the combustion liner 46 may include a first portion 140 and a second portion 142. The first portion 140 may extend from the forward end 110 to the second portion 142. In some embodiments, as shown in FIGS. 8 and 9, the second portion 142 may extend from the first portion 140 to the aft end 112. In other embodiments, as shown in FIGS. 6 and 7, the combustion liner 46 may further include a third portion 144. In such embodiments, the second portion 142 may extend from the first portion 140 to the third portion 144. The first portion 140 and the third portion 144 may extend generally axially (such that both the first portion 140 and the third portion 144 define a constant area).

The second portion 142 may extend radially outwardly from the first portion 140 (and/or the third portion 144. The recirculation zone 146 may advantageously induce flow vortices, thereby increasing residence time which promotes complete combustion of the fuel within the combustion chamber 70. This may be particularly advantageous for slower burning fuels, such as ammonia.

In exemplary embodiments, the second portion 142 of the combustion liner 46 may include, in an axial series (e.g., from forward to aft), a radial segment 160, an axial segment 162, and a converging segment 164. The radial segment 160 may extend generally radially (with respect to the axial centerline 170 of the combustor 17) from an aft end of the first portion 140 to the axial segment 162 of the second portion 142. The axial segment 162 may extend generally axially (with respect to the axial centerline 170 of the combustor 17) from the radial segment 160 to the converging segment 164. The converging segment 164 may converge radially inward as the converging segment 164 extends from the axial segment 162. In some embodiments, as shown in FIGS. 6 and 7, the converging segment 164 may extend from the axial segment 162 to the third portion 144. In other embodiments, as shown in FIGS. 8 and 9, the converging segment 164 may extend from the axial segment 162 to the aft end 112.

As shown, in many embodiments, the first portion 140 defines a first diameter 180, the second portion 142 may define a second diameter 182, and the third portion 144 may define a third diameter 184. The second diameter 182 may be larger than the first diameter 180 (and/or the third diameter 184), such as between about 10% and about 50% larger than the first diameter 180 (and/or the third diameter 184), or such as between about 15% and about 45% larger than the first diameter 180 (and/or the third diameter 184), or such as between about 20% and about 40% larger than the first diameter 180 (and/or the third diameter 184). In embodiments including the third portion 144, as shown in FIGS. 6 and 7, the third diameter 184 may be generally equal to the first diameter 180. For example, the third diameter 184 may be between about 1% and 5% larger or smaller than the first diameter 180, in some embodiments. In other embodiments, the first diameter 180 may be exactly equal to the third diameter 184.

Referring specifically to FIG. 6, the venturi injectors 106 may be disposed within the combustion chamber 70 and coupled to an interior of the first portion 140 of the combustion liner 46. Particularly, the venturi injectors 106 may be coupled to the first portion 140 of the combustion liner 46 upstream (e.g., directly upstream) of the second portion 142 with respect to the flow of combustion gases through the combustion chamber 70. The venturi injector 106 may include a venturi nozzle body 120 having a first slanted wall 123 and a second slanted wall 124. The first slanted wall 123 may partially axially overlap with the center fuel nozzle 100, and the second slanted wall 124 may extend from the first slanted wall 123 to an aft end of the first portion 140 of the combustion liner 46 (i.e., the second slanted wall 124 may extend to the radial segment 160 of the second portion 142). The second slanted wall 124 wall may not overlap the center fuel nozzle 100 (e.g., the second slanted wall 124 may be axially spaced apart from the center fuel nozzle 100).

Still referring to FIG. 6, the air injectors 108 may be disposed outside of the combustion chamber 70 and coupled to the third portion 144 of the combustion liner, such that the air injectors 108 provide air 15 to the combustion chamber 70 downstream of the recirculation zone 146. That is, the air injectors 108 may be disposed on the third portion 144 (e.g., downstream of the second portion 142 and upstream of the aft end 112).

Referring now specifically to FIG. 7, in this embodiment, the fuel injector 105 may be coupled to the second portion 142 of the combustion liner 46 downstream of the first portion 140. In such embodiment, the fuel injectors 105 may each be an axial fuel staged (AFS) injector 107. The AFS injector 107 may be configured to inject fuel, air, or a mixture of fuel and air into the combustion chamber 70 in the radial direction R. As shown in FIG. 7, the AFS injector 107 may be disposed outside of the combustion chamber 70 and coupled to the second portion 142 of the combustion liner 46. Particularly, the AFS injector 107 may be coupled to the axial segment 162 of the second portion 142 (e.g., aft of the radial segment 160 and forward of the converging segment 164). For example, the AFS injector 107 may be coupled to the axial segment 162 closer (e.g., axially closer) to the radial segment 160 than the converging segment 164. In such embodiment, the venturi injectors 106 are omitted.

Referring now specifically to FIG. 8, the venturi injectors 106 may be disposed within the combustion chamber 70 and coupled to an interior of the first portion 140 of the combustion liner 46. Particularly, the venturi injectors 106 may be coupled to the first portion 140 of the combustion liner 46 upstream (e.g., directly upstream) of the second portion 142 with respect to the flow of combustion gases through the combustion chamber 70. The venturi injector 106 may include a venturi nozzle body 120 having a first slanted wall 123 and a second slanted wall 124. The first slanted wall 123 may partially axially overlap with the center fuel nozzle 100, and the second slanted wall 124 may extend from the first slanted wall 123 to an aft end of the first portion 140 of the combustion liner 46 (i.e., the second slanted wall 124 may extend to the radial segment 160 of the second portion 142). The second slanted wall 124 wall may not overlap the center fuel nozzle 100 (e.g., the second slanted wall 124 may be axially spaced apart from the center fuel nozzle 100).

Still referring to FIG. 8, the air injectors 108 may be disposed outside of the combustion chamber 70 and coupled to the second portion 142 of the combustion liner, such that the air injectors 108 provide air 15 to the combustion chamber within the recirculation zone 146. That is, the air injectors 108 may be disposed on the second portion 142 (e.g., downstream of the first portion 140 and upstream of the aft end 112). Particularly, the air injectors 108 may each be coupled to the axial segment 162 of the second portion 142 (e.g., aft of the radial segment 160 and forward of the converging segment 164). For example, the air injectors 108 may be coupled to the axial segment 162 closer (e.g., axially closer) to the converging segment 164 than the radial segment 160.

Referring now specifically to FIG. 9, in this embodiment, the fuel injector 105 may be coupled to the second portion 142 of the combustion liner 46 downstream of the first portion 140. In such embodiment, the fuel injectors 105 may each be an axial fuel staged (AFS) injector 107 instead of venturi injector(s) 106. The AFS injector 107 may be configured to inject fuel, air, or a mixture of fuel and air into the combustion chamber 70 in the radial direction R. As shown in FIG. 7, the AFS injector 107 may be disposed outside of the combustion chamber 70 and coupled to the second portion 142 of the combustion liner 46. Particularly, the AFS injector 107 may be coupled to the axial segment 162 of the second portion 142 (e.g., aft of the radial segment 160 and forward of the converging segment 164). For example, the AFS injector 107 may be coupled to the axial segment 162 closer (e.g., axially closer) to the radial segment 160 than the converging segment 164. The AFS injector 107 is positioned proximate to the radial segment 160 and forward of the air injectors 108.

Referring now to FIGS. 5 through 9, in exemplary embodiments, the combustor 17 may further include a vortex generating element 150 that is configured to induce a recirculation zone 146 within the combustion chamber 70 for the stabilization of a flame. The vortex generating element 150 may be a structure or structures disposed within the combustion chamber, along which the combustion products (e.g., combustion gases and any un-combusted fuel/air) flow, and aft of which a recirculation zone 146 is created due to the induction of flow vortices in the combustion products. The recirculation zone 146 may advantageously promote mixing and complete combustion within the combustion chamber 70, which facilitates the burning of many alternative fuels (such as ammonia or others).

In various embodiments, the vortex generating element 150 may be at least one of the venturi injector 106 and/or the radial segment 160 of the combustion liner 46. For example, in FIG. 5, the vortex generating element 150 may be the venturi injector 106, such that a flow recirculation zone 146 is induced aft of the venturi injector 106. In FIGS. 6 and 8, the vortex generating element 150 may be both the venturi injector 106 and the radial segment 160 of the combustion liner 46, such that both the venturi injector 106 and the radial segment 160 induce the flow recirculation zone 146. In other embodiments, as shown in FIGS. 7 and 9, the vortex generating element 150 may be the radial segment 160, such that the flow recirculation zone 145 is induced aft of the radial segment 160.

The combustors 17 shown and described above with reference to FIGS. 2-9 may advantageously be capable of burning fuel (such as ammonia in exemplary implementations) in an efficient and effective manner. In exemplary embodiments, the combustor 17 shown and described herein may be capable of achieving an equivalence ratio of between about 1 and about 1.7 (or such as between about 1.1 and about 1.5) immediately upstream of the air injectors 108 when operating on ammonia, which enables minimum NOx formation. At the aft end 112, when operating on ammonia, the equivalence ratio may be between about 0.1 and about 0.9, or such as between about 0.2 and about 0.7, which provides for a stable flow upon entrance into the turbine section. Particularly, the center fuel nozzle 100 and the plurality of outer fuel nozzles 102 may create a rich mixture of an ammonia-rich fuel and air in a first rich combustion zone 190 of the combustion chamber 70. The first rich combustion zone 190 may be defined axially between the outer fuel nozzles 102 and the fuel injector 105. Additionally, the fuel injector(s) 105 may be configured to create a rich mixture of ammonia-rich fuel and air in a second rich combustion zone 191 upstream of the air injectors. The second rich combustion zone 191 may extend between the fuel injectors and the air injectors 108. In such implementations, the air injectors 108 may be configured to introduce air into the combustion chamber 70 to create a lean mixture of air and fuel in a lean combustion zone 192 prior to an exit of the combustor. The lean combustion zone 192 may be defined axially between the air injectors 108 and the aft end 112. As used herein, "ammonia-rich fuel" may be a fuel containing a majority of ammonia, such as at least 50% ammonia, or at least 60% ammonia, or at least 70% ammonia, or at least 80% ammonia, or at least 90% ammonia.

As used herein, the equivalence ratio (Φ) is defined as the ratio of the fuel-to-air ratio (or actual ratio) and the stoichiometric fuel-to-air ratio (or theoretical ratio). Mathematically, the equivalence ratio may be calculated as follows:

$$\Phi = \frac{m_{fuel}/m_{air}}{(m_{fuel}/m_{air})_{st}}$$

where m represents the mass and the suffix st stands for stoichiometric conditions.

As used herein, "rich mixture" may refer to a fuel/air or fuel/oxidant mixture having an equivalence ratio (Φ) greater than 1, and "lean mixture" may refer to a fuel/air or fuel/oxidant mixture having an equivalence ratio (Φ) less than 1. A rich mixture may have insufficient oxidants (e.g., air) to result in complete combustion, while a lean mixture may have excess oxidants (e.g., air). Accordingly, the combustor 17 shown and described herein may be capable of achieving a rich mixture upstream of the air injectors 108 and a lean mixture at the aft end 112 due to the diluting effect of air introduced by the air injectors 108.

Figure 10:
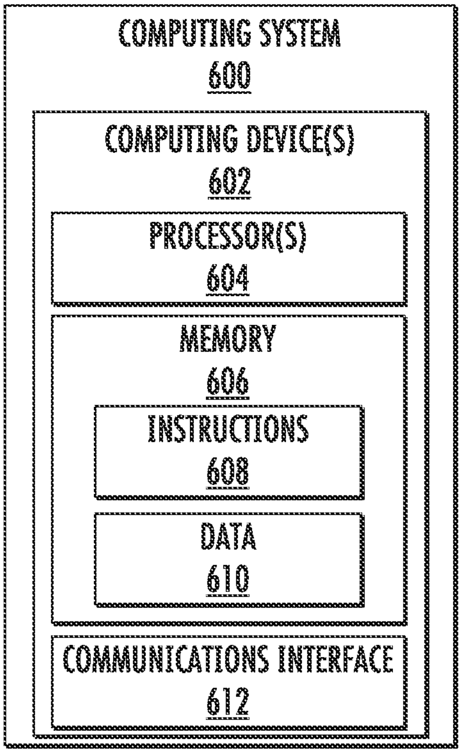
FIG. 10 provides a block diagram of a computing system for implementing one or more aspects of the present disclosure according to example embodiments of the present disclosure.

FIG. 10 provides a block diagram of an example computing system 600. The computing system 600 can be used to implement the aspects disclosed herein. The computing system 600 can include one or more computing device(s) 602. The controller 200 described above with reference to FIG. 2 may be constructed and may operate in a same or similar manner as one of the computing devices 602, for example.

As shown in FIG. 10, the one or more computing device (s) 602 can each include one or more processor(s) 604 and one or more memory device(s) 606. The one or more processor(s) 604 can include any suitable processing device, such as a microprocessor, microcontroller, integrated circuit, logic device, or other suitable processing device. The one or more memory device(s) 606 can include one or more computer-readable media, including, but not limited to, non-transitory computer-readable medium or media, RAM, ROM, hard drives, flash drives, and other memory devices, such as one or more buffer devices.

The one or more memory device(s) 606 can store information accessible by the one or more processor(s) 604, including computer-readable or computer-executable instructions 608 that can be executed by the one or more processor(s) 604. The instructions 608 can be any set of instructions or control logic that when executed by the one or more processor(s) 604, cause the one or more processor(s) 604 to perform operations. The instructions 608 can be software written in any suitable programming language or can be implemented in hardware. In some embodiments, the instructions 608 can be executed by the one or more processor(s) 604 to cause the one or more processor(s) 604 to perform operations.

The memory device(s) 606 can further store data 610 that can be accessed by the processor(s) 604. For example, the data 610 can include sensor data (such as engine parameters), model data, logic data, and the like, as described herein. The data 610 can include one or more table(s), function(s), algorithm(s), model(s), equation(s), and the like, according to example embodiments of the present disclosure.

The one or more computing device(s) 602 can also include a communication interface 612 used to communicate, for example, with the other components of the gas turbine engine. The communication interface 612 can include any suitable components for interfacing with one or more network(s), including, for example, transmitters, receivers, ports, controllers, antennas, or other suitable components.

The technology discussed herein makes reference to computer-based systems and actions taken by and information sent to and from computer-based systems. It will be appreciated that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems.

Figure 11:
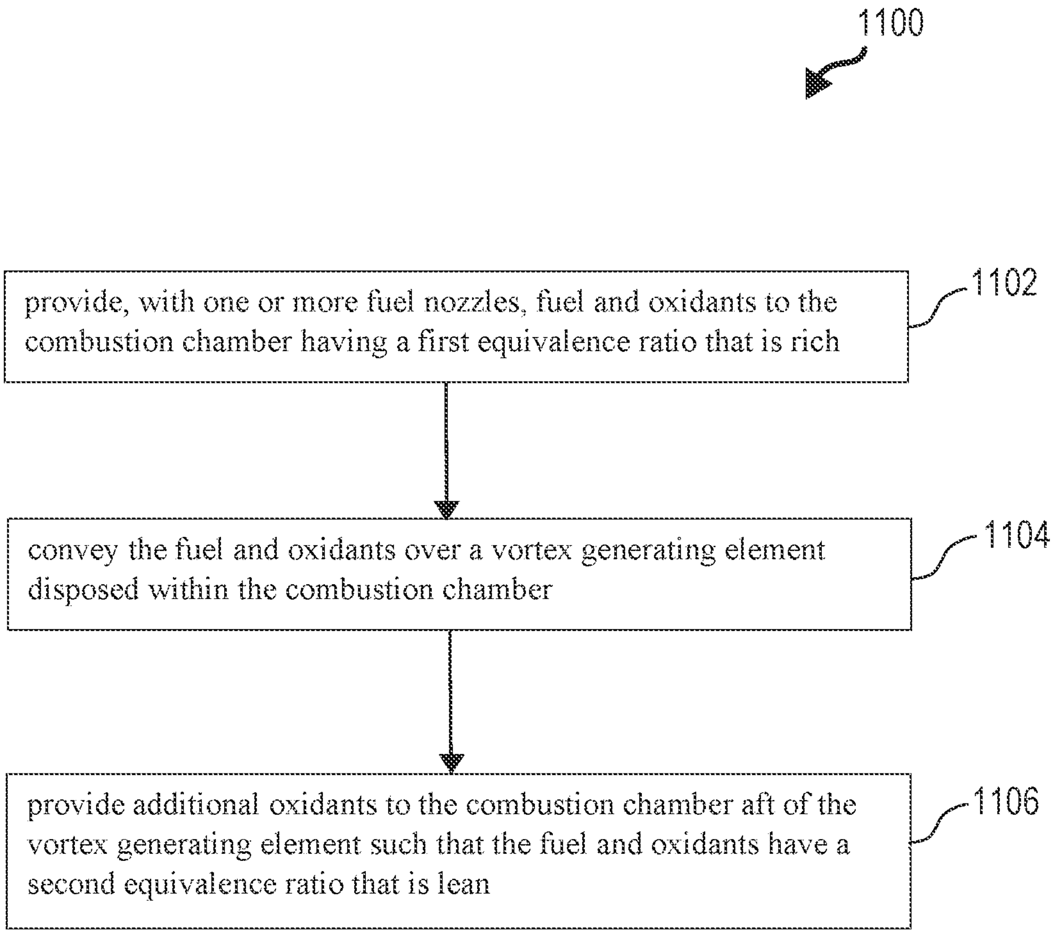
FIG. 11 illustrates a flow chart of a method of operating a combustor in a gas turbine, in accordance with embodiments of the present disclosure.

Referring now to FIG. 11, a flow diagram of one embodiment of a method 1100 of operating a combustor in a gas turbine is illustrated in accordance with embodiments of the present subject matter. In general, the method 1100 will be described herein with reference to the gas turbine 10 and the combustor 17 described above with reference to FIGS. 1-9. However, it will be appreciated by those of ordinary skill in the art that the disclosed method 1100 may generally be utilized with any suitable combustor and/or may be utilized in connection with a system having any other suitable system configuration. In addition, although FIG. 11 depicts steps performed in a particular order for purposes of illustration and discussion, the methods discussed herein are not limited to any particular order or arrangement unless otherwise specified in the claims. One skilled in the art, using the disclosures provided herein, will appreciate that various steps of the methods disclosed herein can be omitted, rearranged, combined, and/or adapted in various ways without deviating from the scope of the present disclosure.

In exemplary embodiments, the method 1100 may include, at step 1102, providing, with one or more fuel nozzles, fuel and oxidant(s) to the combustion chamber having a first equivalence ratio that is rich. For example, the first equivalence ratio may be greater than about 1, such as between about 1.1 and 1.7, or such as between about 1.1 and about 1.5. Subsequently, the method 1100 may include, at step 1102, conveying the fuel and oxidant(s) over a vortex generating element disposed within the combustion chamber. As a result of conveying the fuel and oxidant(s) over the vortex generating element, a recirculation zone may be induced aft of the vortex generating element within the combustion chamber. In exemplary implementations, the method 1100 may further include, at step 1106, providing additional oxidants to the combustion chamber aft of the vortex generating element such that the fuel and oxidants have a second equivalence ratio that is lean. For example, additional oxidants (such as air) may be introduced by the air injector downstream of the vortex generating element to drop the equivalence ratio below 1, such that the fuel and air has a lean equivalence ratio aft of the air injector.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to fall within the scope of the claims if they include structural elements that do not differ from the literal language of the claims, or if they include equivalent structural elements with insubstantial differences from the literal language of the claims.

Further aspects of the invention are provided by the subject matter of the following clauses:

A combustor comprising: a combustion liner extending along an axial centerline from a forward end to an aft end, the combustion liner defining a combustion chamber; a center fuel nozzle extending along the axial centerline at least partially within the combustion chamber; a plurality of outer fuel nozzles surrounding the center fuel nozzle, the plurality of outer fuel nozzles terminating at the forward end; a vortex generating element configured to induce a recirculation zone for the stabilization of a flame; a fuel injector coupled to the combustion liner at least partially downstream of center fuel nozzle; and an air injector coupled to the combustion liner downstream of the fuel injector.

The combustor as in any preceding clause, wherein the vortex generating element is at least one of a venturi injector and a radial segment of the combustion liner.

The combustor as in any preceding clause, wherein the center fuel nozzle and the plurality of outer fuel nozzles create a rich mixture of an ammonia-rich fuel and air in the combustion chamber, and wherein the air injector is configured to introduce air into the combustion chamber to create a lean mixture of air and fuel.

The combustor as in any preceding clause, wherein the ammonia-rich fuel comprises at least 50% ammonia.

The combustor as in any preceding clause, wherein the fuel injector is a venturi injector disposed within the combustion chamber at least partially downstream of the center fuel nozzle.

The combustor as in any preceding clause, wherein the combustion liner includes a first portion and a second portion, the first portion extending from the forward end to the second portion, the second portion extending radially outwardly from the first portion.

The combustor as in any preceding clause, wherein the fuel injector is coupled to the first portion of the combustion liner upstream of the second portion.

The combustor as in any preceding clause, wherein the fuel injector is coupled to the second portion of the combustion liner downstream of the first portion.

The combustor as in any preceding clause, wherein the air injector is coupled to the second portion.

The combustor as in any preceding clause, wherein the second portion includes, in series, a radial segment, an axial segment, and a converging segment.

The combustor as in any preceding clause, wherein the first portion defines a first diameter, wherein the second portion defines a second diameter; and wherein the second diameter is larger than the first diameter.

The combustor as in any preceding clause, wherein the combustion liner further includes a third portion extending from the second portion to the aft end, the third portion defining a third diameter that is generally equal to the first diameter.

The combustor as in any preceding clause, wherein the air injector is coupled to the third portion.

A gas turbine comprising: a compressor section; a turbine section; and a combustion section disposed downstream of the compressor section and upstream of the turbine section, the combustion section including at least one combustor, wherein the at least one combustor comprises: a combustion liner extending along an axial centerline from a forward end to an aft end, the combustion liner defining a combustion chamber; a center fuel nozzle extending along the axial centerline at least partially within the combustion chamber; a plurality of outer fuel nozzles surrounding the center fuel nozzle, the plurality of outer fuel nozzles terminating at the forward end; a vortex generating element configured to induce a recirculation zone for the stabilization of a flame; a fuel injector coupled to the combustion liner downstream of the forward end; and an air injector coupled to the combustion liner downstream of the fuel injector.

The gas turbine as in any preceding clause, wherein the vortex generating element is at least one of a venturi injector and a radial segment of the combustion liner.

The gas turbine as in any preceding clause, wherein the center fuel nozzle and the plurality of outer fuel nozzles create a rich mixture of an ammonia-rich fuel and air in the combustion chamber, and wherein the air injector is configured to introduce air into the combustion chamber to create a lean mixture of air and fuel.

The gas turbine as in any preceding clause, wherein the ammonia-rich fuel comprises at least 50% ammonia.

The gas turbine as in any preceding clause, wherein the fuel injector is a venturi injector disposed within the combustion chamber at least partially downstream of the center fuel nozzle.

The gas turbine as in any preceding clause, wherein the combustion liner includes a first portion and a second portion, the first portion extending from the forward end to the second portion, the second portion extending radially outwardly from the first portion.

A method of operating a combustor in a gas turbine, the combustor comprising a combustion liner that defines a combustion chamber extending between a forward end and an aft end, the method comprising: providing, with one or more fuel nozzles, fuel and an oxidant to the combustion chamber having a first equivalence ratio that is rich; conveying the fuel and oxidant over a vortex generating element disposed within the combustion chamber, whereby a recirculation zone is induced aft of the vortex generating element; and providing additional oxidant to the combustion chamber aft of the vortex generating element such that the fuel and oxidants have a second equivalence ratio that is lean.

What is claimed is:

1. A combustor comprising:

a combustion liner extending along an axial centerline from a forward end to an aft end, the combustion liner defining a combustion chamber, wherein the combustion liner includes a first portion and a second portion, the first portion extending from the forwared end to the second portion, the second portion extending radially outwardly from the first portion;

a center fuel nozzle extending along the axial centerline at least partially within the combustion chamber such that the combustion chamber includes an annular portion defined between the center fuel nozzle and the combustion liner, the annular portion extending from the forward end to a downstream end of the center fuel nozzle;

a plurality of outer fuel nozzles surrounding the center fuel nozzle, the plurality of outer fuel nozzles terminating at the forward end;

a vortex generating element configured to induce a recirculation zone for the stabilization of a flame;

a fuel injector coupled to the combustion liner at least partially downstream of center fuel nozzle; and an air injector coupled to the combustion liner downstream of the fuel injector.

2. The combustor as in claim 1, wherein the vortex generating element is at least one of a venturi injector and a radial segment of the combustion liner.

3. The combustor as in claim 1, wherein the center fuel nozzle and the plurality of outer fuel nozzles create a rich mixture of an ammonia-rich fuel and air in the combustion chamber, and wherein the air injector is configured to introduce air into the combustion chamber to create a lean mixture of air and fuel.

4. The combustor as in claim 3, wherein the ammonia-rich fuel comprises at least 50% ammonia.

5. The combustor as in claim 1, wherein the fuel injector is a venturi injector disposed within the combustion chamber at least partially downstream of the center fuel nozzle.

6. The combustor as in claim 1, wherein the fuel injector is coupled to the first portion of the combustion liner upstream of the second portion.

7. The combustor as in claim 1, wherein the fuel injector is coupled to the second portion of the combustion liner downstream of the first portion.

8. The combustor as in claim 1, wherein the air injector is coupled to the second portion.

9. The combustor as in claim 1, wherein the second portion includes, in series, a radial segment, an axial segment, and a converging segment.

10. The combustor as in claim 1, wherein the first portion defines a first diameter, wherein the second portion defines a second diameter; and wherein the second diameter is larger than the first diameter.

11. The combustor as in claim 10, wherein the combustion liner further includes a third portion extending from the second portion to the aft end, the third portion defining a third diameter that is generally equal to the first diameter.

12. The combustor as in claim 11, wherein the air injector is coupled to the third portion.

13. A gas turbine comprising:

a compressor section;

a turbine section; and a combustion section disposed downstream of the compressor section and upstream of the turbine section, the combustion section including at least one combustor, wherein the at least one combustor comprises:

a combustion liner extending along an axial centerline from a forward end to an aft end, the combustion liner defining a combustion chamber, wherein the combustion liner includes a first portion and a second portion, the first portion extending from the forward end to the second portion, the second portion extending radially outwardly from the first portion;

a center fuel nozzle extending along the axial centerline at least partially within the combustion chamber such that the combustion chamber includes an annular portion defined between the center fuel nozzle and the combustion liner, the annular portion extending from the forward end to a downstream end of the center fuel nozzle;

a plurality of outer fuel nozzles surrounding the center fuel nozzle, the plurality of outer fuel nozzles terminating at the forward end;

a vortex generating element configured to induce a recirculation zone for the stabilization of a flame;

a fuel injector coupled to the combustion liner downstream of the forward end; and an air injector coupled to the combustion liner downstream of the fuel injector.

14. The gas turbine as in claim 13, wherein the vortex generating element is at least one of a venturi injector and a radial segment of the combustion liner.

15. The gas turbine as in claim 13, wherein the center fuel nozzle and the plurality of outer fuel nozzles create a rich mixture of an ammonia-rich fuel and air in the combustion chamber, and wherein the air injector is configured to introduce air into the combustion chamber to create a lean mixture of air and fuel.

16. The gas turbine as in claim 15, wherein the ammonia-rich fuel comprises at least 50% ammonia.

17. The gas turbine as in claim 13, wherein the fuel injector is a venturi injector positioned within the combustion chamber at least partially downstream of the center fuel nozzle.

18. A method of operating a combustor in a gas turbine, the combustor comprising a combustion liner that defines a combustion chamber extending between a forward end and an aft end, wherein the combustion liner includes a first portion and a second portion, the first portion extending from the forward end to the second portioin, the second portion extending radially outwardly from the first portion, the method comprising:

providing, with one or more fuel nozzles including a center fuel nozzle, fuel and an oxidant to the combustion chamber having a first equivalence ratio that is rich, the center fuel nozzle extending along an axial centerline of the combustor at least partially within the combustion chamber such that the combustion chamber includes an annular portion defined between the center fuel nozzle and the combustion line, the annular portion extending from the forward end to a downstream end of the center fuel nozzle;

conveying the fuel and oxidant over a vortex generating element disposed within the combustion chamber, whereby a recirculation zone is induced aft of the vortex generating element;

providing fuel into the combustion chamber with a fuel injector coupled to the combustion liner at least partially downstream of center fuel nozzle; and providing additional oxidant to the combustion chamber aft of the fuel injector such that the fuel and oxidants have a second equivalence ratio that is lean.

19. The combustor as in claim 1, wherein the combustion chamber further includes a main portion extending from the downstream end of the center fuel nozzle to the aft end of the combustion liner.

* * * * *